US008947073B2

(12) United States Patent
Ashby et al.

(10) Patent No.: US 8,947,073 B2
(45) Date of Patent: Feb. 3, 2015

(54) SENSOR ARRANGEMENT TO DETERMINE ROTATIONAL SPEEDS

(75) Inventors: Ronald Ashby, Cannock (GB); Jonathan Norman Wheat, Peoria, IL (US)

(73) Assignees: Synatel Instrumentation Limited, Staffordshire (GB); 4B Components Limited, East Peoria, IL (US)

( * ) Notice: Subject to any disclaimer, the term of this patent is extended or adjusted under 35 U.S.C. 154(b) by 169 days.

(21) Appl. No.: 13/876,420

(22) PCT Filed: Sep. 27, 2011

(86) PCT No.: PCT/GB2011/051822
§ 371 (c)(1),
(2), (4) Date: Jun. 6, 2013

(87) PCT Pub. No.: WO2012/042252
PCT Pub. Date: Apr. 5, 2012

(65) Prior Publication Data
US 2013/0249535 A1   Sep. 26, 2013

(30) Foreign Application Priority Data

Sep. 28, 2010   (GB) .................................. 1016315.2

(51) Int. Cl.
*G01P 3/42*   (2006.01)
*G01P 3/44*   (2006.01)
*G01P 3/487*   (2006.01)
*G01P 21/02*   (2006.01)

(52) U.S. Cl.
CPC . *G01P 3/44* (2013.01); *G01P 3/487* (2013.01); *G01P 21/02* (2013.01)

USPC .......................................................... 324/176

(58) Field of Classification Search
CPC .................................. G01P 3/487; G01P 3/44
USPC .................... 324/176, 207.16, 207.1, 207.13, 324/207.21, 207.25
See application file for complete search history.

(56) References Cited

U.S. PATENT DOCUMENTS 5,477,142 A  *  12/1995  Good et al. .................... 324/166
5,565,769 A  *  10/1996  Mehnert et al. ........... 324/207.15
5,594,173 A     1/1997  Frey et al.

FOREIGN PATENT DOCUMENTS

DE          103 26 989 A1   1/2005
DE     10 2007 036 202 A1   5/2009
JP           10-160756 A    6/1998

* cited by examiner

*Primary Examiner* — Tung X Nguyen

(57) ABSTRACT

A sensor arrangement and method for an inductively rotational sensor consisting of a remote clone coil connected to a processor. The clone coil is located between a proximity sensor including a sensor and a rotating target so that when in an input or interrogatory mode rotational speed of the targets on a rotatable body is detected by the clone coil as a base rotational speed. The processor and the clone coil in an injection or output mode presenting emulating pulses to the sensor to mask the normal sensor coil to target interaction so the sensor coil sees the emulating pulses as the indicator of rotational speed. The emulating pulses proportional to the base speed and adjustable to desired levels of variation from the base speed as a reference.

47 Claims, 4 Drawing Sheets

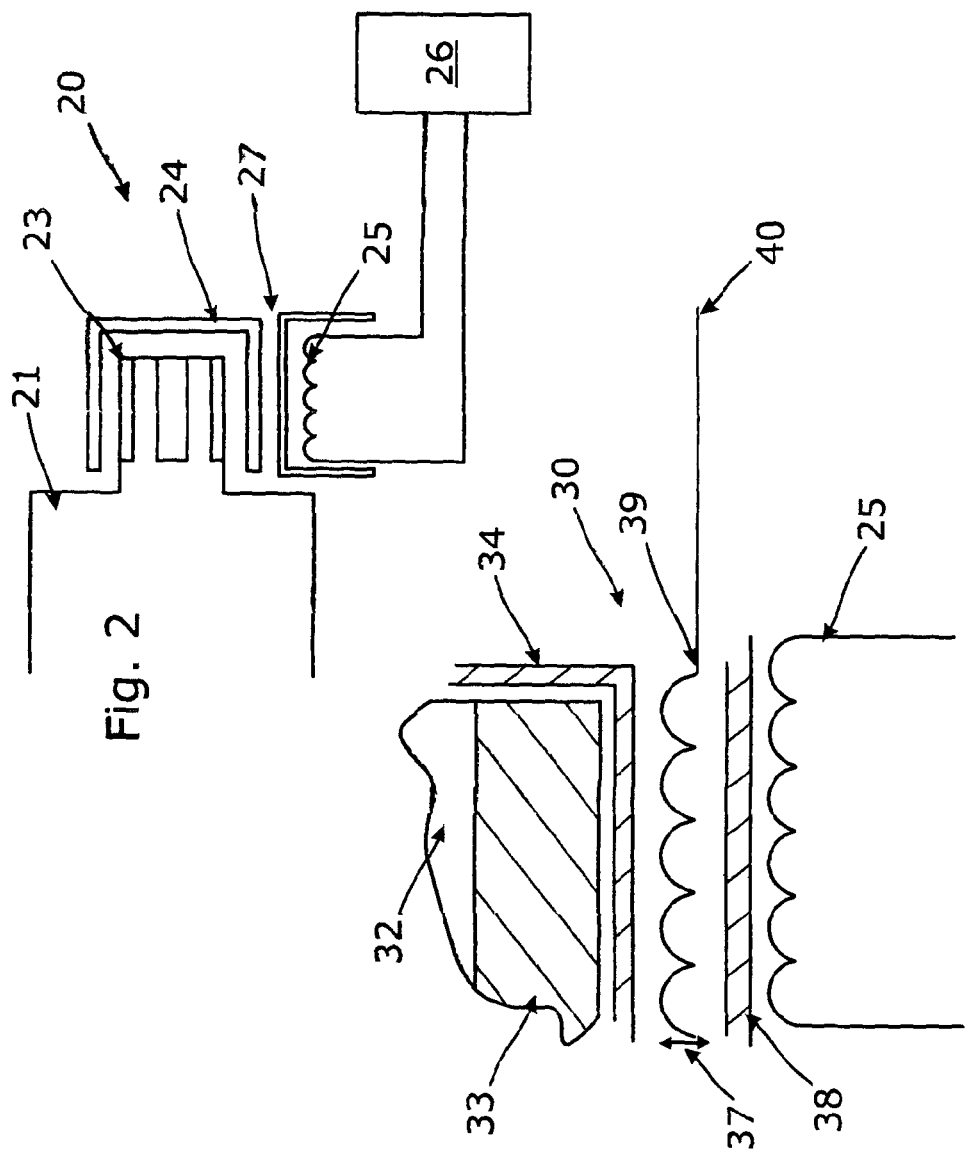
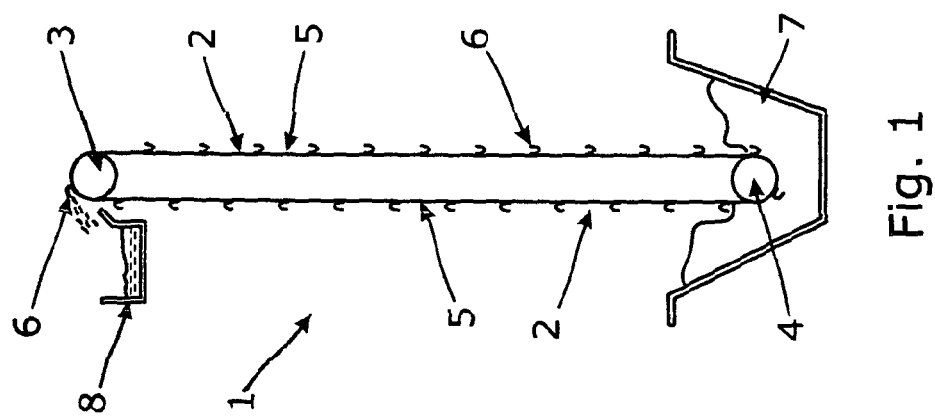

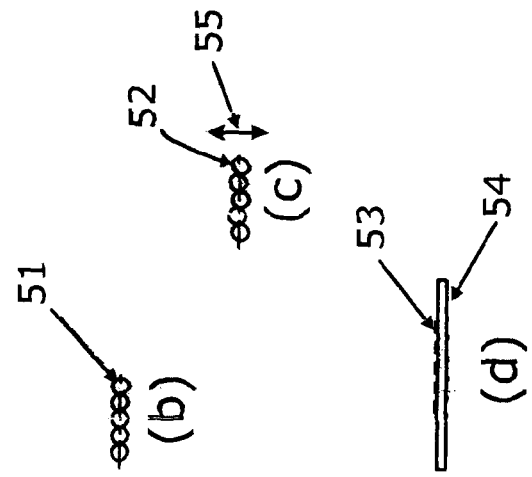
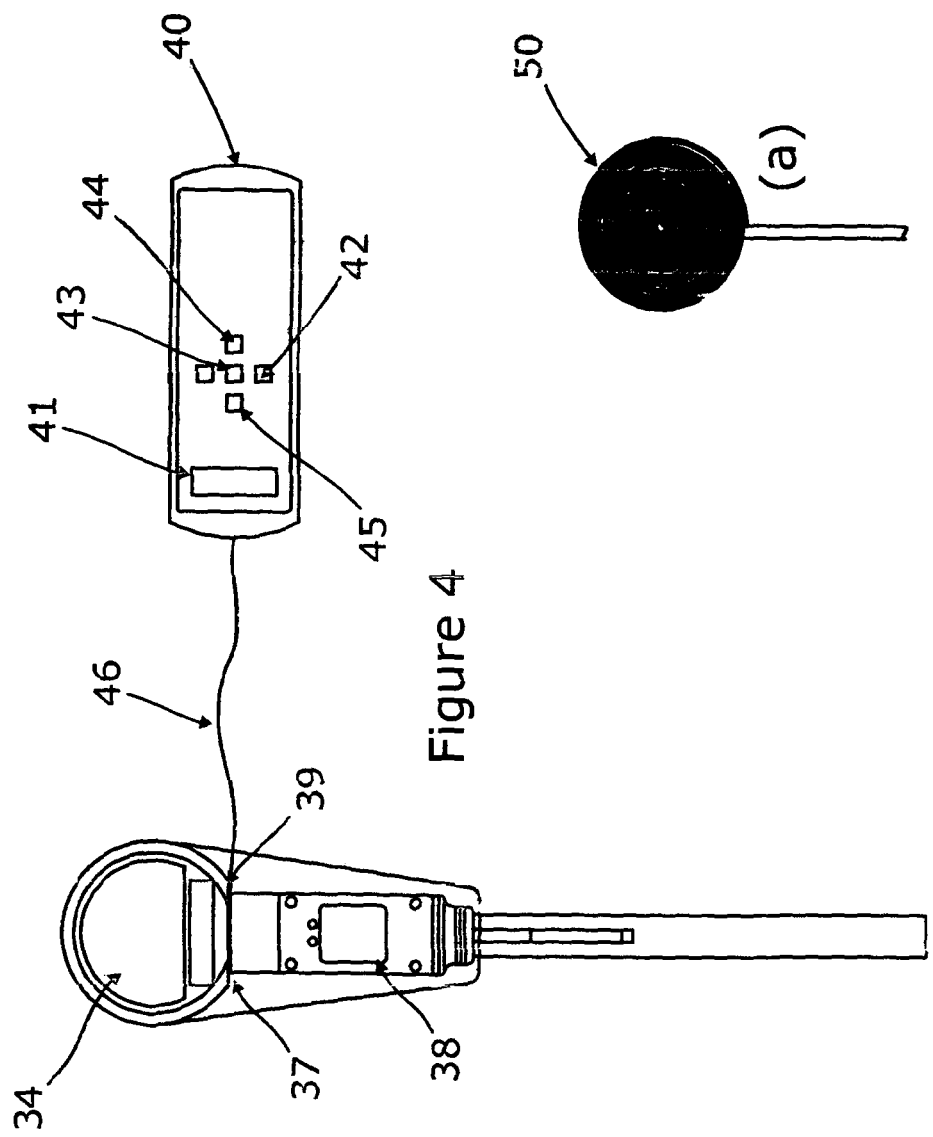
Figure 4
Figure 5

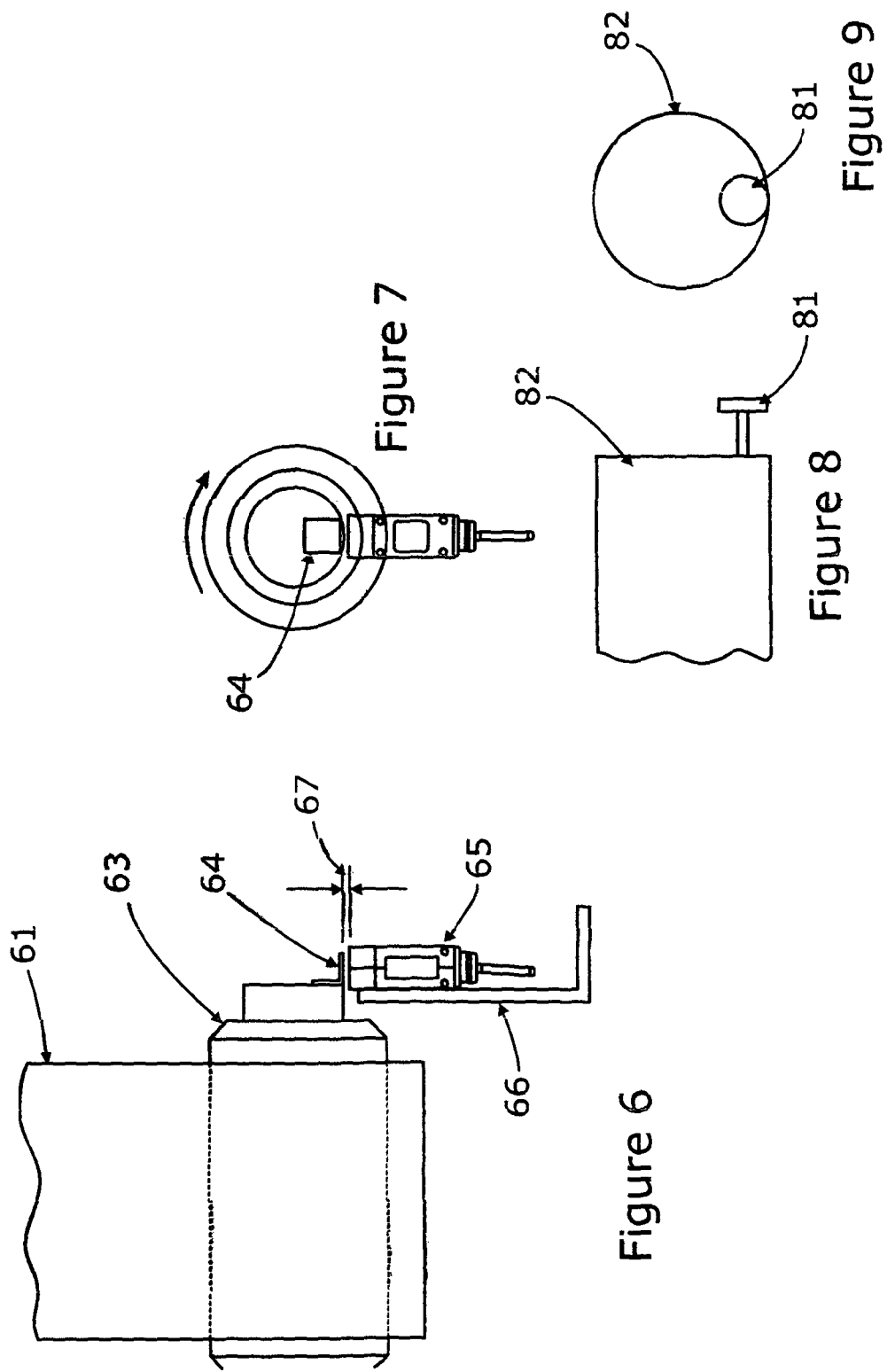

SENSOR ARRANGEMENT TO DETERMINE ROTATIONAL SPEEDS

This invention relates generally to sensor arrangements and more particularly to a sensor arrangement and methods of using sensor arrangements used to monitor or determine rotational speeds of shafts and other rotatable bodies.

A number of installations use a driving shaft, typically driven by an electric motor, to drive an idling shaft through a belt or chain. One form of installation is commonly referred to as an elevator and can be arranged to move commodities such as powder or granular materials. There may be a number of shafts but of particular interest is the shaft normally positioned furthest from the driving shaft and so at a return end of the belt or chain installation. The speed at the driven end is constant so determination of the rotational speed at the return end may indicate lack of tension, predict system malfunction and/or allow optimisation of installation operation. It will be appreciated that changes in speed, whether reduction or increase, may indicate drag or rub or motor stressing which can generate heat or sparks.

Sensor arrangements to determine rotational speed should be as reliable as possible. Magnetic or proximity sensors are used with a target or targets associated with a shaft or other rotatable body to determine rotational speed. Each time the target is in the proximity of the sensor a pulse count is registered so the number of pulses per unit time is indicative of rotational speed. At set up, an initial base rotational speed is determined so variations, normally slowing, at differing deviation levels can be set to trigger alarms or auto shut down.

A partial system test can be achieved by inserting a metal plate between sensor and target to block sensor effects. A conductive metal strip between the target and sensor creates a 100% perceived variation in speed to show the sensor arrangement is basically working. Such an approach will not determine whether there is correct operation at the actual desired trigger deviation levels with regard to speed. It may be necessary to perform bench testing with possible problems of plant down time and concerns as to whether the sensor was or will be correctly re-calibrated on re-installation. An alternative is to use the proximity sensor as a feed to a remote controller which itself incorporates a speed display; if the remote controller sees the speed deviation then an alarm or shut down should occur.

In accordance with first aspects of the present invention there is provided a sensor arrangement for a target upon a rotatable body and a sensor interaction, the arrangement comprising a clone coil for location in use between the target and the sensor whereby in use a first clone coil configuration in an interrogatory mode provides base pulses to a processor at a base rate indicative of a base speed of a rotatable body in use having a target and in a second clone coil configuration in an injection mode provides emulating pulses in use to a sensor at a rate proportionate to the base speed In accordance with second aspects of the present invention there is provided a sensor arrangement for a target upon a rotatable body and a sensor interaction, the arrangement comprising a clone coil for location in use between the target and the sensor, the clone coil configured to provide:—
 (a) In a substantively open circuit being effectively transparent to the target and the sensor interaction as the target rotates in use;
 (b) In the substantively open circuit to interact with the sensor whereby base pulses are induced periodically in the clone coil at a base rate proportional to the target motion relative to the sensor and the base pulses provided to a processor; and,
 (c) In a substantially closed circuit transmit emulating pulses stimulated by the processor to the sensor at a strength sufficient to mask the target and sensor interaction and the emulating pulses provided at a rate proportionate to the base rate.

In accordance with third aspects of the present invention there is provided a method of determining whether a sensor arrangement configured to provide a trigger signal at a proportion of a base speed of a rotatable body in use is operating correctly, the method including the following steps:—
 (a) Locating a clone coil between a target and a sensor arranged to determine by electrical pulses in the sensor coil due to motion of the target the speed of a rotatable body;
 (b) In an interrogatory mode arranging for the clone coil in a first clone coil configuration to generate base pulses in the clone coil at a base rate indicative of a base speed in use of the rotatable body due to electrical interaction of the target with the sensor coil;
 (c) In an injection mode the clone coil in a second clone coil configuration is arranged to inject emulating pulses towards the sensor at a rate proportionate to the base speed to emulate expected pulses which would be generated in the sensor as the target rotates in use and at which the trigger signal should be provided by the sensor arrangement.

The first clone coil configuration and the second clone coil configuration may be provided by the same clone coil component. Alternatively, the first clone coil configuration and the second clone coil configuration may be provided by two different clone coil components switchable into the first clone coil configuration and the second clone coil configuration respectively.

The clone coil may be substantially planar. The clone coil can be wound in a spiral. The clone coil may be formed with a stagger offset between juxtaposed winds. Typically, the clone coil may be formed from wire or strands of woven wire. The wire or strands may be so-called Litz wire. The clone coil may have a planar thickness dependent upon an expected gap between a target mounting and an sensor coil housing in use and normally less than 1 mm, preferably less than 0.75 mm. The wire forming the clone coil may be waxed or surface coated. The clone coil may be stiffened to facilitate presentation in use in an expected gap between a target mounting and the sensor coil housing. The clone coil may be encapsulated.

The clone coil may be integrally formed within a housing for the sensor coil and adjacent that coil. Alternatively, the clone coil may be presented in a housing for a rotatable body incorporating a target.

The clone coil and/or the processor may be associated with a wireless connection or link.

The processor may be associated with adjustment means to adjust the proportion of the base speed and so the rate at which the emulating pulses are injected. The adjustment means may be progressive or stepped. The processor will include means for setting the base speed to provide a reference for the adjustment means.

Possibly, the sensor comprises a ferrite core with a coil about it. The sensor carries a low energy electrical current oscillating at a known frequency. The known frequency is in a range up to 100 KHz and preferably around 40 KHz. The target is electrically conductive so in proximity with the sensor coil receives transferred energy from the electrical current whereby oscillations in the low energy electrical current collapse as a pulse indicative of target to sensor coil interaction.

Embodiments of aspects of the present invention will now be described by way of example only with reference to the accompanying drawings in which:

FIG. 1 is a schematic side illustration of a transport system using a conveyor and shafts;

FIG. 2 is a schematic side cross-section of a sensor arrangement used to monitor shaft rotational speed;

FIG. 3 is a more detailed view of the arrangement depicted in FIG. 2 with the sensor arrangement in accordance with aspects of the present invention;

FIG. 4 is a schematic end view of the arrangement as depicted in FIG. 3;

FIG. 5 is a schematic illustration of a coil in accordance with aspect of the present invention;

Figure 11:
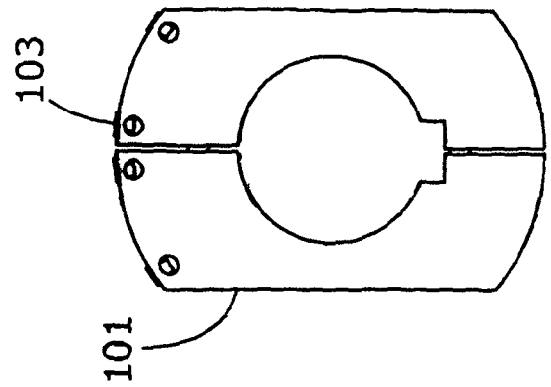
Figure 10:
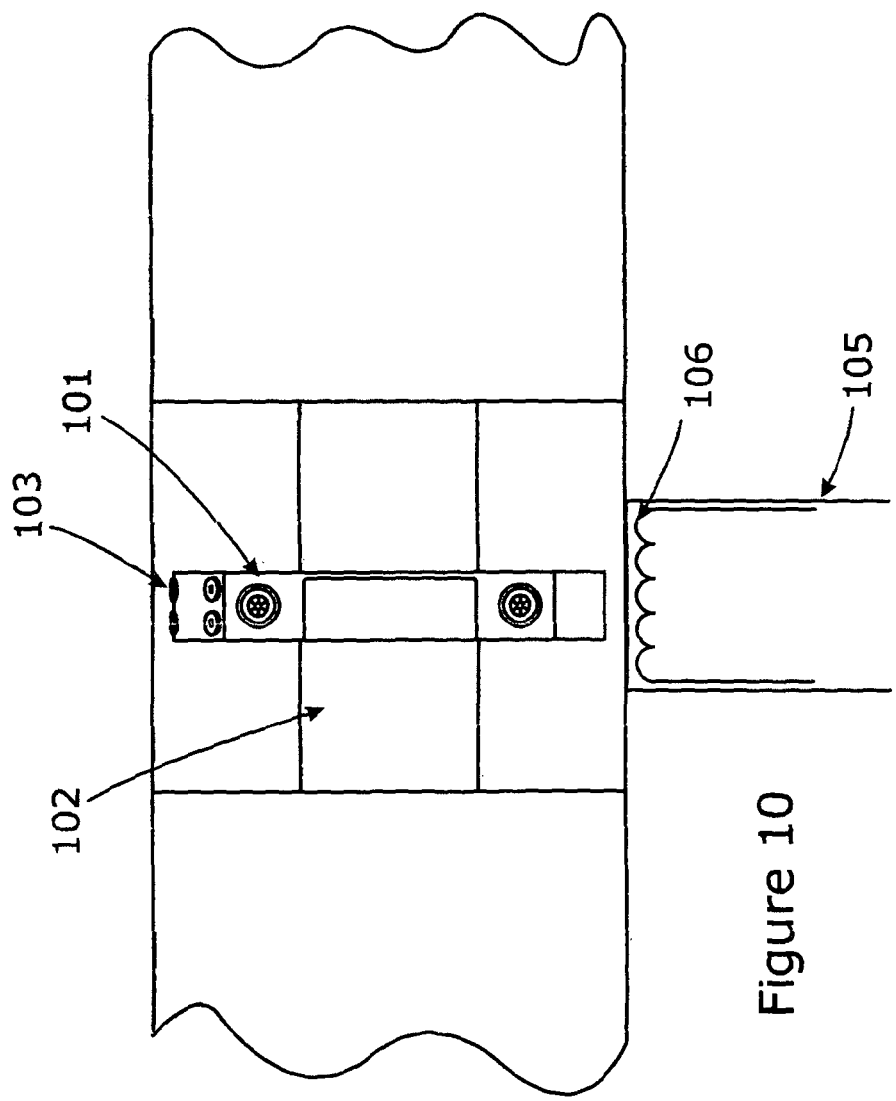

FIG. 6 provides a schematic side illustration of a first alternative sensor arrangement;

FIG. 7 provides a part end view of the arrangement shown in FIG. 6;

FIG. 8 provides a schematic side illustration of a second alternative target;

FIG. 9 provides an end view of the target as depicted in FIG. 8;

FIG. 10 is a schematic side view of a second alternative sensor arrangement; and, FIG. 11 provides schematic end view of the target as depicted in FIG. 10.

One of the objectives of aspects of the present invention is a device to measure and test calibration and function of sensors used to monitor rotating or reciprocating shafts on machinery and provide alarms, shutdown signals or other outputs when measured speed deviates from a predefined level.

Aspects of the present invention provide a remote coil which acts to clone, mimic and emulate target to sensor coil interaction. The remote coil as a clone coil is connected to a control unit or processor so that emulating pulse can be injected to mask normal target to sensor coil interaction. The clone coil is placed between rotational targets to be monitored and the sensor coil to detect such targets without affecting normal pulsing of the sensor coil due to conductive target proximity. The clone coil can also mask or over power the target to sensor coil interaction by injecting the emulating pulse at a rate in proportion to a base rate expected for a rotatable body with which the targets rotate.

Basically, the front end of a typical proximity sensor consists of a ferrite core with a coil known hereafter as a sensor coil. A circuit injects a low energy 40 KHz signal into the sensor coil. When a metal or conductive object approaches the sensor coil, energy is transferred into the metal object and because there is insufficient energy to maintain the oscillator, the signal oscillations in the sensor coil collapse. Such collapse is seen as a pulse and used to detect that metal is present. Rotational speeds up to 66 Hz can be achieved but use of higher frequencies may get a faster response so rotational speed ranges which can be determined depend upon operational choices.

When the clone coil is inserted between the sensor coil and target in an interrogatory or measuring mode it is effectively in open circuit and so is electrically invisible to the sensor coil as it draws little energy to disturb the low energy signal. The clone coil does however pick up the 40 KHZ signal from the sensor coil by electrical induction. In other words, the clone coil becomes the 'secondary' coil of an effective transformer with the sensor coil as the primary. When oscillations collapse in the sensor coil this means a conductive target is in proximity. By measuring oscillation/no oscillation periods in the clone coil it is therefore possible to determine target frequency (speed of shaft rotation×number of targets per revolution).

Having determined a base speed, high energy pulses are injected by the clone coil at 40 KHz or whatever the signal frequency is operational in the sensor coil interspersed with alternate periods when the clone coil is short circuited. Initially, the frequency of 40 KHz pulses/short circuiting will be set to the same frequency as the speed measured from the shaft initially and hence the sensor arrangement through the clone coil can take control of the sensor coil seamlessly when the clone coil is set to generation or injection mode.

In the interrogatory or measuring mode, the signal measured is about 250 mV to the sensor coil. In the injection or generation mode the signal to the sensor coil is about 2.5V which is sufficient to override the normal sensor coil interaction with or without the metal target present. The sensor coil simply "sees" a 40 KHz signal or nothing indicating no target or a target as appropriate. Thus, there is control of the sensed speed as seen by the sensor coil and the sensor arrangement ignores the true shaft speed represented by the true but weaker target to sensor coil interaction.

An open circuit clone coil is invisible, and a shorted clone coil is visible to the sensor. There are therefore three states, open circuit (for measuring actual speed), short circuit (so that it looks like a target) and generating a 40 KHz signal (to make it appear to the sensor as if no target is present).

FIG. 1 provides a schematic side illustration of a transport system 1 for materials using a belt 2 presented between shafts 3, 4 and upon jockey rollers 5. The conveyor belt 2 in the example shown has buckets 6 to lift a commodity 7 between a hopper 9 and a receptacle 8. The shaft 3 is driven by a prime mover such as an electric motor (not shown) with the belt 2 under tension by appropriate tension devices (not shown) so that an idler or tail shaft 4 at one end is driven by the belt 2. A desired speed for the shaft 4 will be affected by friction and variations in the commodity 7 e.g. water content as well as other factors such as wear and tear.

If the rotational speed of the shaft 4 varies significantly this could be a pre-curser to drive motor burn-out or that rub and slippage is producing heat leading to further degradation and extension of the belt. In combustible environments such heating may also result in a fire or an explosion. Variations in the rotational speed of the idler shaft 4 will be monitored typically by a target in proximity to the sensor. The rotational speed of the driven shaft 3 is known so that theoretically the speed of the idler shaft 4 should be the same and matched as a base speed. The target inter-action with the sensor will give an indication of rotational speed through the number of pulses determined by the sensor per unit of time such as per second or per minute. By extrapolation, levels of speed variation can be determined at which triggers for alarms and shut down of the driven system will occur. The variations could be percentages of the speed for the drive shaft 3 or the expected speed of the shaft 3. When the sensor arrangement identifies a rotational speed variation from the base speed then the alarm trigger or shut down will occur. The difficulty is checking whether the sensor arrangement is working properly and correctly at the desired variation levels and not just working per se, that is to say rotation above or below a detection level is at least seen by the sensor. It will be understood that transport systems such as conveyors do not operate continuously so testing will normally occur when the transport system is not loaded that is to say empty so the weight of the material does not affect results.

It is relatively easy to simulate a shaft stoppage with a conductive blocking plate (steel rule) between a target or targets and the proximity sensor as described above. Normally, a number of targets are provided to increase the number of pulses particularly at low speeds and so the sampling rate will reduce problems of one or two missed pulses causing excessive distortion of results. Thus, with a blocking plate no pulses will lead to shut down but this does not confirm operation at the desired variations e.g. 10% or 20% deviations typically used as triggers for an alarm or shutdown.

FIG. 2 provides a schematic side cross-section of a typical example of a sensor arrangement 20 to monitor rotational speed of a shaft 21. The shaft 21 has an integral or otherwise attached end 22 with targets 23 preferably within a cover 24 if required to provide environmental as well as operational protection. The targets 23 rotate with the shaft 21 in order to determine rotational speed and sweep past a sensor coil 25. When each target 23 is in proximity to the coil 25 the relative location registers as a pulse in the sensor coil 25 as described above. Counting of such pulses by an appropriate processor 26 allows determination of rotational speed by simple calculation; if there are X targets then if Y pulses are detected then rotational speed is Y divided by X revolutions per minutes (rpm) or whatever time reference is used.

As can be seen in FIG. 2 the sensor coil 25 is positioned relative to the targets 23 to facilitate interaction between them. A typical sensing distance to target is 8-10 mm to allow fitting of a protective plastic cover to prevent snagging. There may only be a gap 27 of only 0.8 mm or so to allow for some rotational eccentricity of the end or shaft. The gap 27 is sufficiently wide for a steel rule or other blanking electrical conductor to be inserted.

Complete failure of rotation of the shaft 21 is not what needs to be sensed but rather pre-indicative deviations of typically certain percentages in rotational speed e.g. 10% for an alarm trigger and 20% for a shut-down. The processor 26 will be set to trigger the alarm and shut down at the desired percentage deviations in rotational speed but testing of these trigger levels is not achieved by a total blocking of pulses with a steel rule or tape in the gap 27. It will be understood that correct operation of the sensor arrangement 20 at the desired percentage deviation is important as such deviations may be a pre-cursor to catastrophic failure which may be more problematic as it may have more effect upon production programmes. Furthermore, deviations may highlight wear and tear/rubbing of belts which can present heat as a fire and/or explosion risk in certain environments.

Traditionally, to test whether alarms are working at percentages of deviation the sensor arrangement would be bench tested and a true indication of practical operation may not be determined. More recently regulatory authorities have introduced more stringent requirements and at least guidelines as to operation of motor driven systems. It is important to regularly check operation of percentage alarm and shutdown deviation triggers in sensor systems for shaft speed. As indicated in some environments, such as cereals transportation, over heating of conveyor systems can be a potential source of fire or explosions.

FIG. 3 provides a schematic cross-section of a sensor arrangement 30 in accordance with aspects of the present invention. As previously, a shaft end 32 has at least one target 33 to interact with a sensor coil 35 whereby pulses, seen as collapses in signal oscillations due to the proximity of a conductive target or targets are counted to determine speed. The shaft end 32 in the embodiment shown is in a guard cover 34 and the sensor coil 35 in a housing 38 so there is only a limited gap 37 between them.

In accordance with aspects of the present invention there is provided a clone coil 39 which is located in the gap 37. The clone coil 39 as described below is configured so that it is transparent to the target 33 and sensor coil 35 relationship whilst operating in an interrogatory mode. Pulses in the interrogatory mode are picked up by the coil 35 and operation of the sensor arrangement can continue as normal. The clone coil 39 is formed of so called Litz wire or woven wire which is multi-stranded. In the interrogatory mode the clone coil 39 is substantially electrically invisible but can however detect pulses which are fed back to the processor normally provided in a hand held device so that speed can be determined.

Each rotational shaft, motor and conveyor belt will produce slightly different results. An advantage of aspects of the present invention is that the clone coil 39 will produce a reference count for that particular rotational shaft and sensor arrangement which can be more assuredly manipulated to test the sensor arrangement. Thus, if a rotational shaft is notionally or is expected to operate at 200 rpm it is hoped that the sensor arrangement will in such circumstances detect 200 multiplied by the number of targets as the pulse count to be determined by the processor 26 (FIG. 2). Conveyors and elevators may operate at speeds in the range 1 rpm to 3600 rpm but speeds as low as 0.2 rpm are not uncommon and speeds up to 10000 rpm may be requested. This may not be the case and in any event the installer of the actual driven motor or conveyor system or the sensor arrangement may not be absolutely accurate with their initial commissioning, calibration and set-up. The present invention aims to avoid such problems by using actual results determined in an interrogatory mode which are then used in an injection mode to mask, the target produced pulses in the sensor coil 35. The arrangement is configured to 'inject' emulating pulses from the clone coil 39 to the sensor coil 35 at the desired deviation levels in order to stimulate alarm and/or shut down trigger signals.

In the interrogatory mode the motor/conveyor system will be operating normally so the clone coil 39 will pick up pulses at a base rate associated with that normal operation. For example the pulse rate may be 1000 pulses per minute so a 10% reduction deviation would be 900 pulses per minute and 20% reduction deviation would be 800 pulses per minute. Thus, in order to test the sensor arrangement 30 the coil 39 will be switched to an output or injection mode to give 900 or 800 emulating pulses comprising periods of closed circuit and periods of power signals at the oscillation frequency of the sensor coil respectively which mask the true target induced pulses. n the output or injection mode the injected emulating pulses mask the target 33 induced pulses in the sensor coil 35 making them invisible or ignored by the processor 26 (FIG. 2)

The clone coil 39 can and does produce far more powerful signals from direct electrical power in the sensor coil 35 compared with pulses through relative rotation between the target 33 and the coil 35. The injected emulating signal pulses from the clone coil 39 will normally be at least 10 times more powerful than pulses which can be created by inter-action of the target 33 to coil 35. If the sensor arrangement 30 is working correctly then when the emulating pulse levels for 10% and 20% or any other desired trigger deviations are reached then the triggers for alarms and shut-down respectively in the system will be activated.

In terms of a method of operation as depicted in FIG. 3 and FIG. 4 initially the clone coil 39 is located in the gap 37 between the target or targets 33 and the sensor coil 35 in an interrogatory mode when the driven system is working normally. The clone coil 39 is substantially in an open circuit condition in this interrogatory mode so the clone coil 39 will not block pulsing between target 33 and coil 35 but pulsing in the sensor coil 35 will be picked up by the clone coil 39 as calibration base pulses. The clone coil 39 is associated with a test processor 40 so that the calibration pulses can be counted. As indicated the number of base pulses per unit time is indicative of shaft rotational speed and so end 32 rotational speed; either the number of pulses or the rotational speed can be depicted in a display 41 of the processor 40. The value determined is set as the base pulse rate value for the sensor arrangement in accordance with aspects of the present invention. Typically, a mode switch 42 is provided to enable switching between the interrogatory mode and the generating injection/output mode described later. Once a base value of pulse rate or rotational speed has been established then a set or calibrate button 43 is pressed to store the base value for calculation. Normally, deviation buttons 44, 45 are also provided for desired trigger levels of deviation such as 10% and 20% respectively. These buttons 44, 45 will be pressed to initially determine the deviation value of pulse rate or rotational speed respectively for display in the display 41. The mode will then be switched by operation of the mode switch 42 to enter the output or injection mode whereby the current pulse rate or rotational speed will be displayed in the display 41. In the injection mode the clone coil 39 injects pulses to emulate pulsing due to the target to sensor coil interaction but the coil 39 in terms of configuration as well as the strength of the pulses effectively masks the actual true pulses in operation of the target or targets 33 to sensor coil 35 interaction so that the sensor coil 35 only effectively 'sees' the emulating pulses injected by the clone coil 39.

A shift or adjuster button 44 is provided to shift the injected emulating pulses presented through the coil 39 towards the trigger deviations (10% or 20%). When these deviations are achieved then the associated alarms or shutdown trigger signals should be provided by the base sensor system processor 26 (see FIG. 2). The alarm signal and/or the shutdown signals should be practically operated to ensure the whole system is working or the trigger signals just registered to show the sensor arrangement is working whilst not disturbing on-going production and processes. When speed falls below the shutdown setting then the system will shut down The processor 40 and the clone coil 39 may be connected by a wire 46 as depicted or using a wireless connection such as Bluetooth between them. Furthermore, where particularly a wireless arrangement is used it will be understood that testing may be periodic by permanently or when required locating the clone coil 39 in the gap 37. Thus, when required say once a day or a week or monthly the coil 39 can be placed in the interrogatory mode. Once the base value for pulse rate is acquired or determinable this can be sent to a remote processor in a control room by a wired or wireless link and operation then performed as above with a hand held processor device or a control room keyboard so that the rate of emulating pulses will be altered until an alarm trigger is raised or a shutdown signal issued. It will also be appreciate when a fixed or permanently associated clone coil 39 is provided then an exposed tail or other connector may be provide for a user with a hand-held device to plug into when required.

As will be appreciated configuration of the clone coil 39 is important to ensure it is effectively transparent in the interrogatory mode whilst in the injection mode blanking/masking those pulses in favour of the emulating pulses projected by the clone coil 39. FIG. 5 provides a schematic illustration of a clone coil 50 in accordance with aspects of the present invention. To achieve effective transparency for induced pulses by a target or targets with a sensor coil the clone coil 50 is substantially planar with one layer of wire or woven wire strands, so called Litz wire. The wire is normally waxed or surface coated to provide one or more of the following—stiffening, facilitating assembly, electrical isolation between wires/strands so that a substantially continuous electrically conductive 'foil' may be avoided, to allow back or reinforcement mountings to be associated with the clone coil and to provide some articulation between adjacent/juxtaposed wire and strands in use. Ordinary thin solid wire will also work but may be more difficult to form into a coil.

The clone coil 50 depicted in FIG. 5 (*a*) is shown in a plan view with a spiral forming the coil 50. As shown in the part cross-sections in FIG. 5 (*b*) and FIG. 5 (*c*) the wires or woven stands can be side-by-side 51 as shown in FIG. 5 (*b*) or staggered/offset 52 relative to each other as shown in FIG. 5 (*c*) to provide alternatives with respect to construction as well as the aspect depth 55 in the plane of the clone coil 50 which may affect strength as well as pulse transparency in the interrogatory mode and emulating pulse strength in the injection mode.

A further alternative for clone coil construction is to create a printed circuit board (pcb) coil as depicted in FIG. 5 (*d*) where bands of conductive material 53, 54 are etched away to form the coil on a motherboard. The bands of material 53, 54 may have different widths, thicknesses, spacing between windings or otherwise. Furthermore it may be possible in some circumstances to provide respectively different 'coils' in different coil configurations either side of the motherboard. The coils either side of the mother board may have the same configuration in terms of interrogatory and injection responses or different configurations again to give differences in response in the interrogatory mode and the injection mode.

Examples of ways to provide clone coil constructions are provide below.

EXAMPLE 1

A clone coil is formed from Litz wire in a plane. The coil has a 32 mm diameter by 0.75 mm thickness in the plane (total thickness including stiffening material). The clone coil is configured to have 450 μH inductance at 13.5 Ohm resistance. It produces an output emulating pulse of 180 mV peak to peak from a typical target to sensor coil interaction. The 0.75 mm thickness is dependent upon an expected gap between effective housings/mountings for the sensor coil and the targets. The thickness of the clone coil is that allowed for insertion into the gap. The Litz wire used is waxed.

EXAMPLE 2

A clone coil formed using conventional ordinary 'solid' wire. The coil has a 33 mm diameter by 1.2 mm thickness as such conventional wire coils are more difficult to fabricate. The resulting clone coil was found to have an inductance of 1.4 mH at 22 Ohm resistance. The output emulating pulse is 250 mV peak to peak. The coil was made from 300 turns of 0.15 mm dia. wire.

EXAMPLE 3

A pcb based clone "coil" of 25 turns of 10 thousandths track to give a notional 30 mm dia. The clone coil produced a resistance of 2 Ohm and inductance of 6 μH. The coil gives an output of about 25 mV which is generally not acceptable for conventional sensor arrangements for determining rotational speed. Current sensor circuitry may not be able to detect such low signal levels and the clone coil suffers from a low signal to noise ratio. Furthermore in an injection mode the emulating pulses generated may not deliver enough signal strength to override or sufficiently mask the target created pulses in the underlying sensor coil of a conventional rotational speed sensor arrangement. Thus, on a PCB it may be necessary to provide a multi-layer coil with higher resistance to produce a higher output. Furthermore, the interrogatory mode could be modified to accept lower pulse levels and drive the emulator signal generator in the injection mode much harder if required.

As indicated above aspects of the present invention have particular applicability to conveyor and elevator systems where one end is driven by a motor or other prime mover and the other end an idler or tail roller. In an ideal situation the belt will be tensioned so that the rotational speed of the drive (motor) shaft will be the same as the idler or tail shaft but slippage and other factors mean practically there will be some difference; monitoring and triggered alarms are therefore important so that excessive problems cannot produce dangerous consequences. Calibration of the sensor arrangement so that triggers operate at the right levels of deviation is becoming an increasing requirement of regulatory authorities such as the HSE in UK and OSHA in the USA.

As described above a sensor arrangement in accordance with aspects of the present invention can be a hand-held device comprising a clone coil connected to a processor handset with control buttons for base speed/pulse rate setting and adjustment buttons for altering the proportioning to the supposed and desired trigger levels. The adjustment buttons can be gradual and ramped or stepped and incremental to desired levels of deviation. Thus, the injected emulating pulses will typically be ramped down or up to the trigger levels and so stimulating respective triggers for alarms. The overall driven system can continue to operate so saving valuable processing time with testing normally performed when the conveyor system is empty. The emulating pulse signals are provided when the clone coil is closed circuited and coupled to a pulse generator associated with the processor and such proportioning of the emulating pulses is directed by the processor so masking the target to sensor coil pulsing normally used to monitor shaft or other rotatable body rotational speed.

It will be understood to avoid spurious triggering it is conventional for there to be a time period e.g. 4 seconds during initial start up of a driven system such as a conveyor or elevator when triggers will be ignored or sampling does not take place as it will be expected that rotational speed will be different from that expected. Aspects of the present invention may use that facility during a system test process when the emulating signals are injected to avoid triggering actually causing alarms or even shut down or such alarms may be simply ignored or de-activated during such periods. However, initiation of the triggers shows the system is working correctly and will be recorded.

Rather than a wired connection it will be appreciated that a wireless connection or link may be provide between the clone coils and the processor or an integrated clone coil/processor combination to a centralised control panel or otherwise. Thus, when required in a large plant installation rather than sending periodically a technician to each remote and possibly difficult location on site testing can be initialled at the central control through wired or wireless links as required.

As indicated above generally the clone coils will be spiral in nature but it may be possible to create acceptable serpentine or oval wound coils but generally substantially planar in aspect and configuration. The coils may be slightly dished or undulating or otherwise shaped to provide the interrogation mode transparency pick-up from the sensor coil and injection mode pulse signal power to mask or over power that of the normal target to sensor coil inter-action of the base sensor arrangement.

The clone coil used in accordance with aspects of the present invention will normally be the same component in both a first clone coil configuration for the interrogation mode and in a second clone coil configuration for the injection mode but there may be difficulties with normal target to sensor coil inter-action. Thus, the clone coil may comprise two separate components switchable as will be understood by those skilled in the technology to create the respective first and second clone coil configurations.

The wires or strands of the clone coil may be all of the same diameter or configuration or varied to create the desired action in a first and a second clone coil configuration as described.

The clone coils may be integrally formed with the housing for the sensor coil or a part of a mounting for the rotatable shaft or other body. Thus, the clone coils will always be consistently presented but then it is even more important that the normal target to sensor coil inter-action in a conventional sensor arrangement is not unduly or is consistently impaired for the occasional monitoring/confirmation purposes of aspects of the present invention.

In summary a preferred sensor checker or arrangement is in two parts, a control unit or processor and a flat clone coil which is plugged into the control unit via a cable. In operation, the clone coil is inserted between the speed sensor and target such that it covers the sensing face of the sensor. At this point, the coil is invisible to the sensor and does not interfere with the normal operation of the plant. The control unit is then switched on. In the first interrogatory mode, the clone coil remains invisible but it can draw a minute amount of energy from the sensor which allows detection each time a target passes. This allows the control unit to calculate the exact speed of the shaft which can then be displayed.

The control unit can now be set to the second or injection mode and so will cause inject of the emulating pulses through the clone coil at a controlled rate initially consisted with the measured base rate determined by the target and sensor coil interaction. At this point, the true target is invisible to the sensor. The "electronic" speed can now be lowered (or raised) and at some point the speed sensor will trip. It may be a single output or dual output device in terms of alarm deviation levels. In any event, the speeds at which trigger outputs occur or the machine is tripped can be noted and compared with that shown on the control unit to check that the trip points are at the level required by the user or as required by applicable regulations. It will be understood that the targets produce an essentially digital output which is counted to allow emulation by the clone coil but in some systems an analogue signal could be determined in the interrogatory mode and that analogue signal emulated in the injection or output mode.

The control unit has lots of features such as its ability to calculate and display the correct speed for 90% and 80% of normal by pushing a button.

Although the examples provided above relate to conveyors and elevators it will be understood that driven shafts are used in a number of other systems such as baggage handling and transportation belts or stone crushers where changes in speed can be due to jamming and overload.

Although described above with regard to variations in rotational speed which are reductions it will also be understood that some systems detect over-speeds to avoid stressing of components and other factors. Thus, alarms and shutdown will be triggered at certain levels of deviation, normally percentages, and the present sensor arrangement can be used to check correct operation at those over-speed conditions.

Changes in notional electronic speed induced by the sensor arrangement in accordance with aspects of the present invention can be incremental or direct to particular trigger levels to check operation. With an incremental approach, it will be understood that determination where exactly trigger signals are actually given can be made to determine acceptability and possibly drift over time of the sensor arrangement due to environmental or other factors.

As illustrated above the target to sensor coil interaction in accordance with aspects of the present invention can comprise surface targets on a stub end of a shaft or other rotatable body. A first alternative sensor configuration is illustrated schematically in FIG. 6 and FIG. 7. As previously a belt 61 is associated with a shaft 62 with an end 63. In accordance with this configuration a section of angle iron 64 is attached to the end 63. Thus, the iron 64 will move relative to a sensor 65 with the end 63 and shaft 62. As described previously as the iron 64 is conductive the sensor coil (not shown) will produce pulses in an oscillating signal which can be counted to determine shaft rotational speed. The sensor 65 is presented on a bracket 66 with a gap 67 so there is appropriate pick up of the target 64 to sensor 65.

A second alternative target configuration is illustrated in FIG. 8 and FIG. 9 as a schematic side view and end view. A target 81 is a bucket bolt secured to a shaft 82. Again the conductive nature of the target will interrupt the electrical signal oscillation in a sensor coil (not shown). The interruptions will be seen as pulses which can be counted to determine rotational speed. Bucket bolts are used and preferred due to their large heads making them ideal as targets.

A second alternative sensor arrangement 100 is depicted in FIG. 10 whilst FIG. 11 shows a target 101 used in the arrangement 100. One shaft 102 has two parts 102a, 102b with a section 102c between them. The shaft 102 has a plastic target 101 fitted to it. Metal strips 103 are fitted so that they can be detected when in proximity to a sensor 105 and more particularly to a sensor coil 106. Pulses are registered as described previously.

It will be appreciated by those skilled in the art that any number of combinations of the aforementioned features and/or those shown in the appended drawings provide clear advantages over the prior art and are therefore within the scope of the invention described herein.

The invention claimed is:

1. A sensor arrangement for a target upon a rotatable body and an sensor coil interaction, the arrangement comprising a clone coil for location in use between the target and the sensor coil whereby in use a first clone coil configuration in an interrogatory mode provides base pulses to a processor at a base rate indicative of a base speed of a rotatable body in use having a target and in a second clone coil configuration in an injection mode provides emulating pulses in use to an sensor coil at a rate proportionate to the base speed.

2. A sensor arrangement for a target upon a rotatable body and an sensor coil interaction, the arrangement comprising a clone coil for location in use between the target and the sensor coil, the clone coil configured to provide:—
   a. In a first clone coil configuration provide a substantively open circuit be effective transparent to the target and the sensor coil interaction as the target rotates in use;
   b. In the first clone coil configuration to interact with the sensor coil whereby base pulses are induced periodically in the clone coil at a base rate proportional to the target motion relative to the sensor coil and the base pulses provided to a processor; and,
   c. In a second clone coil configuration provide a substantially closed circuit transmit emulating pulses stimulated by the processor to the sensor coil at a strength sufficient to mask the target and sensor coil interaction and the emulating pulses provided at a rate proportionate to the base rate.

3. An arrangement as claimed in claim 1 wherein the first clone coil configuration and the second clone coil configuration are provided by the same clone coil component.

4. An arrangement as claimed in claim 1 wherein the first clone coil configuration and the second clone coil configuration are provided by two different clone coil components switchable into the first clone coil configuration and the second clone coil configuration respectively.

5. An arrangement as claimed in claim 1 wherein the clone coil is substantially planar.

6. An arrangement as claimed in claim 1 wherein the clone coil is wound in a spiral.

7. An arrangement as claimed in claim 1 wherein the clone coil is formed with a stagger offset between juxtaposed winds.

8. An arrangement as claimed in claim 1 wherein the clone coil is formed from wire or strands of woven wire.

9. An arrangement as claimed in claim 8 wherein the wire or strands is so-called Litz wire.

10. An arrangement as claimed in claim 8 wherein the wire forming the clone coil is waxed or surface coated.

11. An arrangement as claimed in claim 1 wherein the clone coil has a planar thickness dependent upon an expected gap between a target mounting and an sensor coil housing in use and normally less than 1 mm, preferably less than 0.75 mm.

12. An arrangement as claimed in claim 1 wherein the clone coil is stiffened to facilitate presentation in use in an expected gap between a target mounting and the sensor coil housing.

13. An arrangement as claimed in claim 1 wherein the clone coil is encapsulated.

14. An arrangement as claimed in claim 1 wherein the clone coil is integrally formed within housing for the sensor coil and adjacent that sensor coil.

15. An arrangement as claimed in claim 1 wherein the clone coil is presented in rotatable body housing for a rotatable body incorporating a target.

16. An arrangement as claimed in claim 1 wherein the clone coil and/or the processor is associated with a wireless connection or link.

17. An arrangement as claimed in claim 1 wherein the processor is associated with adjustment means to adjust the proportion of the base speed and so the rate at which the emulating pulses are injected.

18. An arrangement as claimed in claim 17 wherein the adjustment means is progressive or stepped.

19. An arrangement as claimed in claim 17 wherein the processor includes means for setting the base speed to provide a reference for the adjustment means.

20. An arrangement as claimed in claim 1 wherein the sensor coil comprises a ferrite core with a coil about it.

21. An arrangement as claimed in claim 1 wherein the sensor coil has a low energy electrical current oscillating at a known frequency.

22. An arrangement as claimed in claim 21 wherein the known frequency is in a range up to 60 KHz and preferably around 40 KHz.

23. An arrangement as claimed in claim 1 wherein the target is electrically conductive so in proximity with the sensor coil receives transferred energy from the electrical current whereby oscillations in the low energy electrical current collapses as a pulse indicative of target to sensor coil interaction.

24. A method of determining whether a sensor arrangement configured to provide a trigger signal at a proportion of a base speed of a rotatable body in use is operating correctly, the method including the following steps:—
   a. Locating a clone coil between a target and a sensor coil arranged to determine by electrical pulses in the sensor coil due to motion of the target the speed of a rotatable body;
   b. In an interrogatory mode arranging for the clone coil in a first clone coil configuration to generate base pulses in the clone coil at a base rate indicative of a base speed in use of the rotatable body due to electrical interaction of the target with the sensor coil;
   c. In an injection mode the clone coil in a second clone coil configuration is arranged to inject emulating pulses towards the sensor coil at a rate proportionate to the base speed to emulate expected pulses which would be generated in the sensor coil as the target rotates in use and at which the trigger signal should be provided by the sensor arrangement.

25. A method as claimed in claim 24 wherein includes adjustment to adjust the proportion of the base speed and so the rate at which the emulating pulses are injected.

26. A method as claimed in claim 25 wherein adjustment is progressive or stepped.

27. A method as claimed in claim 25 wherein the method includes setting the base speed to provide a reference for adjustment.

28. An arrangement as claimed in claim 2 wherein the first clone coil configuration and the second clone coil configuration are provided by two different clone coil components switchable into the first clone coil configuration and the second clone coil configuration respectively.

29. An arrangement as claimed in claim 2 wherein the clone coil is substantially planar.

30. An arrangement as claimed in claim 2 wherein the clone coil is wound in a spiral.

31. An arrangement as claimed in claim 2 wherein the clone coil is formed with a stagger offset between juxtaposed winds.

32. An arrangement as claimed in claim 2 wherein the clone coil is formed from wire or strands of woven wire.

33. An arrangement as claimed in claim 32 wherein the wire or strands is so-called Litz wire.

34. An arrangement as claimed in claim 32 wherein the wire forming the clone coil is waxed or surface coated.

35. An arrangement as claimed in claim 2 wherein the clone coil has a planar thickness dependent upon an expected gap between a target mounting and an sensor coil housing in use and normally less than 1 mm, preferably less than 0.75 mm.

36. An arrangement as claimed in claim 2 wherein the clone coil is stiffened to facilitate presentation in use in an expected gap between a target mounting and the sensor coil housing.

37. An arrangement as claimed in claim 2 wherein the clone coil is encapsulated.

38. An arrangement as claimed in claim 2 wherein the clone coil is integrally formed within housing for the sensor coil and adjacent that sensor coil.

39. An arrangement as claimed in claim 2 wherein the clone coil is presented in rotatable body housing for a rotatable body incorporating a target.

40. An arrangement as claimed in claim 2 wherein the clone coil and/or the processor is associated with a wireless connection or link.

41. An arrangement as claimed in claim 2 wherein the processor is associated with adjustment means to adjust the proportion of the base speed and so the rate at which the emulating pulses are injected.

42. An arrangement as claimed in claim 41 wherein the adjustment means is progressive or stepped.

43. An arrangement as claimed in claim 41 wherein the processor includes means for setting the base speed to provide a reference for the adjustment means.

44. An arrangement as claimed in claim 2 wherein the sensor coil comprises a ferrite core with a coil about it.

45. An arrangement as claimed in claim 2 wherein the sensor coil has a low energy electrical current oscillating at a known frequency.

46. An arrangement as claimed in claim 21 wherein the known frequency is in a range up to 60 KHz and preferably around 40 KHz.

47. An arrangement as claimed in claim 1 wherein the target is electrically conductive so in proximity with the sensor coil receives transferred energy from the electrical current whereby oscillations in the low energy electrical current collapses as a pulse indicative of target to sensor coil interaction.

* * * * *